(12) United States Patent
Hansen et al.

(10) Patent No.: US 10,590,571 B2
(45) Date of Patent: Mar. 17, 2020

(54) ULTRA-RESILIENT PAD

(75) Inventors: Robert A. Hansen, North Muskegon, MI (US); Bjorn Rydin, Horby (SE)

(73) Assignee: Albany International Corp., Rochester, NH (US)

( * ) Notice: Subject to any disclaimer, the term of this patent is extended or adjusted under 35 U.S.C. 154(b) by 1290 days.

(21) Appl. No.: 12/479,258

(22) Filed: Jun. 5, 2009

(65) Prior Publication Data

US 2010/0112275 A1 May 6, 2010

Related U.S. Application Data

(63) Continuation-in-part of application No. 12/345,215, filed on Dec. 29, 2008.

(Continued)

(51) Int. Cl.
*B32B 5/12* (2006.01)
*D03D 15/08* (2006.01)
(Continued)

(52) U.S. Cl.
CPC ............... *D03D 15/08* (2013.01); *A43B 1/04* (2013.01); *A43B 13/181* (2013.01); *B32B 5/024* (2013.01); *B32B 5/026* (2013.01); *B32B 5/08* (2013.01); *B32B 5/12* (2013.01); *B32B 5/26* (2013.01); *B32B 7/03* (2019.01); *B32B 25/10* (2013.01); *B32B 27/12* (2013.01); *B32B 27/40* (2013.01); *D03D 7/00* (2013.01); *D03D 11/00* (2013.01); *D03D 15/0083* (2013.01); *D04H 3/04* (2013.01); *B32B 2262/0253* (2013.01); *B32B 2262/0261* (2013.01); *B32B 2262/0292* (2013.01); *B32B 2262/103* (2013.01); *B32B 2262/14* (2013.01); *B32B 2307/51* (2013.01); *B32B 2307/514* (2013.01); *B32B 2307/56* (2013.01); *B32B 2307/724* (2013.01); *B32B 2307/7265* (2013.01); *B32B 2437/02* (2013.01);
(Continued)

(58) Field of Classification Search
CPC ....................................................... B32B 5/12
See application file for complete search history.

(56) References Cited

U.S. PATENT DOCUMENTS 2,919,217 A * 12/1959 Bobkowicz ................... 428/108
2,919,467 A * 1/1960 Mercer ............... B29C 47/0033
156/167

(Continued)

FOREIGN PATENT DOCUMENTS

| CN | 1914373 B | 5/2010 |
|---|---|---|
| DE | 42 02 325 A | 8/1993 |

(Continued)

OTHER PUBLICATIONS

Definition "loom" Complete Textile Glossary, Celanese Acetate LLC, Copyright 2001.*

(Continued)

*Primary Examiner* — Andrew T Piziali
(74) *Attorney, Agent, or Firm* — McCarter & English, LLP

(57) ABSTRACT

A structure for use as a compressible ultra-resilient pad is disclosed. The structure includes axially and radially elastic hollow members and relatively inelastic yarns in various patterns. The structure has a high degree of both compressibility under an applied normal load and excellent recovery (resiliency or spring back) upon removal of that load.

18 Claims, 12 Drawing Sheets

Related U.S. Application Data

(60) Provisional application No. 61/017,447, filed on Dec. 28, 2007.

(51) Int. Cl.

| | | |
|---|---|---|
| A43B 1/04 | (2006.01) | |
| A43B 13/18 | (2006.01) | |
| D03D 15/00 | (2006.01) | |
| D03D 7/00 | (2006.01) | |
| B32B 5/08 | (2006.01) | |
| D03D 11/00 | (2006.01) | |
| D04H 3/04 | (2012.01) | |
| B32B 27/12 | (2006.01) | |
| B32B 25/10 | (2006.01) | |
| B32B 5/02 | (2006.01) | |
| B32B 5/26 | (2006.01) | |
| B32B 27/40 | (2006.01) | |
| B32B 7/03 | (2019.01) | |

(52) U.S. Cl.
CPC ....... *B32B 2471/00* (2013.01); *B32B 2571/02* (2013.01); *Y10T 428/24074* (2015.01); *Y10T 442/3024* (2015.04); *Y10T 442/3472* (2015.04)

(56) References Cited

U.S. PATENT DOCUMENTS

| | | | |
|---|---|---|---|
| 3,095,258 A * | 6/1963 | Scott | D01D 5/24 264/177.13 |
| 3,384,692 A * | 5/1968 | Galt | B29C 47/0033 156/167 |
| 3,553,857 A | 1/1971 | Isham et al. | |
| 3,630,824 A * | 12/1971 | Rohlig | D01D 5/24 264/209.5 |
| 3,723,218 A * | 3/1973 | Gaffney | B29C 47/0033 156/167 |
| 3,733,721 A | 5/1973 | Clemens | |
| 3,815,645 A | 6/1974 | Codorniu | |
| 4,088,805 A * | 5/1978 | Wiegand | B29C 44/12 442/370 |
| 4,323,622 A * | 4/1982 | Gladh et al. | 442/324 |
| 4,328,840 A * | 5/1982 | Fontana | 139/419 |
| 4,328,841 A * | 5/1982 | Fontana | 139/419 |
| 4,350,731 A | 9/1982 | Siracusano | |
| 4,555,440 A | 11/1985 | Crook | |
| 4,569,874 A * | 2/1986 | Kuznetz | 428/109 |
| 4,569,883 A * | 2/1986 | Renjilian | 442/194 |
| 4,608,768 A | 9/1986 | Cavanagh | |
| 4,781,967 A | 11/1988 | Legge et al. | |
| 4,870,998 A * | 10/1989 | Westhead | 139/383 A |
| 4,931,358 A | 6/1990 | Wahl et al. | |
| 4,979,543 A | 12/1990 | Moriarty et al. | |
| 5,087,327 A | 2/1992 | Hood | |
| 5,360,656 A | 11/1994 | Rexfelt et al. | |
| 5,368,696 A | 11/1994 | Cunnane, III et al. | |
| 5,401,564 A | 3/1995 | Lee et al. | |
| 5,436,052 A * | 7/1995 | Basse | B21F 27/20 428/105 |
| 5,480,646 A | 1/1996 | Vu | |
| 5,560,401 A * | 10/1996 | Miglus | 139/383 R |
| 5,597,450 A | 1/1997 | Baker et al. | |
| 6,039,821 A | 3/2000 | Buck | |
| 6,146,499 A * | 11/2000 | Lin et al. | 162/197 |
| 6,179,965 B1 | 1/2001 | Cunnane, III et al. | |
| 6,391,420 B1 * | 5/2002 | Cederblad et al. | 428/107 |
| 6,413,889 B1 | 7/2002 | Best et al. | |
| 6,630,223 B2 * | 10/2003 | Hansen | 428/131 |
| 6,723,208 B1 | 4/2004 | Hansen | |
| 2002/0072290 A1 | 6/2002 | Johnson | |
| 2002/0100572 A1 | 8/2002 | Cunnane, III | |
| 2002/0162246 A1 | 11/2002 | Mayer et al. | |
| 2003/0217484 A1 | 11/2003 | Christensen et al. | |
| 2003/0228815 A1 | 12/2003 | Bhatnagar et al. | |
| 2004/0005832 A1 | 1/2004 | Neculescu et al. | |
| 2004/0023582 A1 | 2/2004 | Espe | |
| 2004/0219854 A1 | 11/2004 | Groitzsch et al. | |
| 2005/0081570 A1 | 4/2005 | Karlsson et al. | |
| 2006/0029772 A1 | 2/2006 | Huang et al. | |
| 2006/0278328 A1 | 12/2006 | Westerkamp et al. | |
| 2007/0163741 A1 | 7/2007 | Crook | |
| 2007/0194490 A1 | 8/2007 | Bhatnagar et al. | |
| 2007/0202314 A1 | 8/2007 | Youn et al. | |
| 2008/0166533 A1 | 7/2008 | Jones et al. | |
| 2009/0176427 A1 | 7/2009 | Hansen et al. | |
| 2009/0181590 A1 | 7/2009 | Hansen et al. | |
| 2010/0129597 A1 | 5/2010 | Hansen et al. | |
| 2012/0189806 A1 | 7/2012 | Hansen et al. | |

FOREIGN PATENT DOCUMENTS

| | | |
|---|---|---|
| DE | 10 2004 038770 | 2/2006 |
| EP | 0306313 A | 3/1989 |
| EP | 0505788 A | 3/1992 |
| EP | 1302578 A | 4/2003 |
| EP | 1386723 A | 2/2004 |
| EP | 1568808 A | 8/2005 |
| EP | 1 719 834 A | 11/2006 |
| GB | 1118784 | 7/1968 |
| GB | 2197886 A | 6/1988 |
| JP | 2003-193326 A | 7/2003 |
| WO | WO 93/17180 A | 9/1993 |
| WO | WO 2004/005018 A | 1/2004 |
| WO | WO 2004/072368 A | 8/2004 |
| WO | WO 2005/075734 A | 8/2005 |
| WO | WO 2007/067949 A | 6/2007 |
| WO | WO 2009/086533 A | 7/2009 |
| WO | WO 2010/030298 A | 3/2010 |

OTHER PUBLICATIONS

BPAI Decision on Appeal, U.S. Appl. No. 10/699,997, mailed Dec. 19, 2011.*
Definition "laminated" Merriam-Webster Dictionary, http://www.merriam-webster.com/dictionary/laminated.*
Definition "laminated" Merriam-Webster's Collegiate Dictionary, Eleventh Edition, p. 698.*
Dictionary definition of "soft", Webster's New World College Dictionary, Wiley Publishing, 2010.*
International Search Report and Written Opinion from EPO for PCT/US2008/088478 dated Jul. 2, 2009.
International Search Report and Written Opinion from EPO for PCT/US2008/088450 dated Apr. 15, 2009.
International Search Report and Written Opinion from EPO for PCT/US2010/036398 dated Sep. 15, 2010.
International Search Report and Written Opinion from EPO for PCT/US2010/036385 dated Oct. 7, 2010.
International Search Report and Written Opinion from International Application PCT/US2012/022029.
International Search Report and Written Opinion from International Application PCT/US2012/022035.
Notification of First Office Action, including search report, issued by Chinese Patent Office for corresponding Chinese application 201280009844.1 dated Sep. 3, 2014, English translation only.
Dell'Isola, Francesco et al.: "A Two-Dimensional Gradient-Elasticity Theory for Woven Fabrics", *Journal of Elasticity, The Physical and Mathematical Science of Solids*, Jan. 2015, pp. 113-125, vol. 118, No. 1.
Gu, Huang: "Tensile behaviours of woven fabrics and laminates", *Materials and Designs*, 2007, pp. 704-707, vol. 28, issue 2.
Homaeigohar, Seyed Shahin et al.: "Novel compaction resistant and ductile nanocomposite nanofibrous microfiltration membranes, *Journal of Colloid and Interface Science*", Apr. 15, 2012, pp. 6-15, vol. 372.
Gonca, V. et al.: "Theoretical and Experimental Studies of Stiffness Properties of Laminated Elastomeric Structures", presented at 9th International DAAM Baltic Conference "Industrial Engineering", Apr. 24-26, 2014 in Tallinn, Estonia, pp. 342-347.

(56) References Cited

OTHER PUBLICATIONS

Woodford, Chris, "Composites and laminates", *Explainthatstuff!*, Jul. 13, 2015, http://www.explainthatstuff.com/composites.html ; accessed on Nov. 20, 2015.

"Non Wovens and Laminates Make Their Way Into Press Felts", *Pulp & Paper Canada*, Feb. 29, 2000, http://www.pulpandpapercanada.com/innovation/non-wovens-and-laminates-make-their-way-into-press-felts-1000107127 ; accessed on Nov. 20, 2015.

"Woven Fabrics", *NetComposites Now*, published courtesy of David Cripps, Gurit, http://www.netcomposites.com/guide-tools/guide/reinforcements/woven-fabrics/ , accessed on Nov. 20, 2015.

Kaw, Autar K.: *Mechanics of Composite Materials $2^{nd}$ Ed.*, 2006, pp. 52-53, Taylor and Francis Group. https://books.google.com/books?id=MwHLBQAAQBAJ&pg=PA53&lpg=PA53&dq=%22what+is+a+laminate%22+-floor&source=bl&ots=0RHWB8ye64&sig=cDYgwldYguJag18GoXdiG4ZLQIM&hl=en&sa=X&ved=0CCMQ6AEwAWoVChM13_-p9pCdyQIVzLIeCh22CABs#v=onepage&q=%22what%20is%20a%20laminate%22%20-floor&f=false.

* cited by examiner

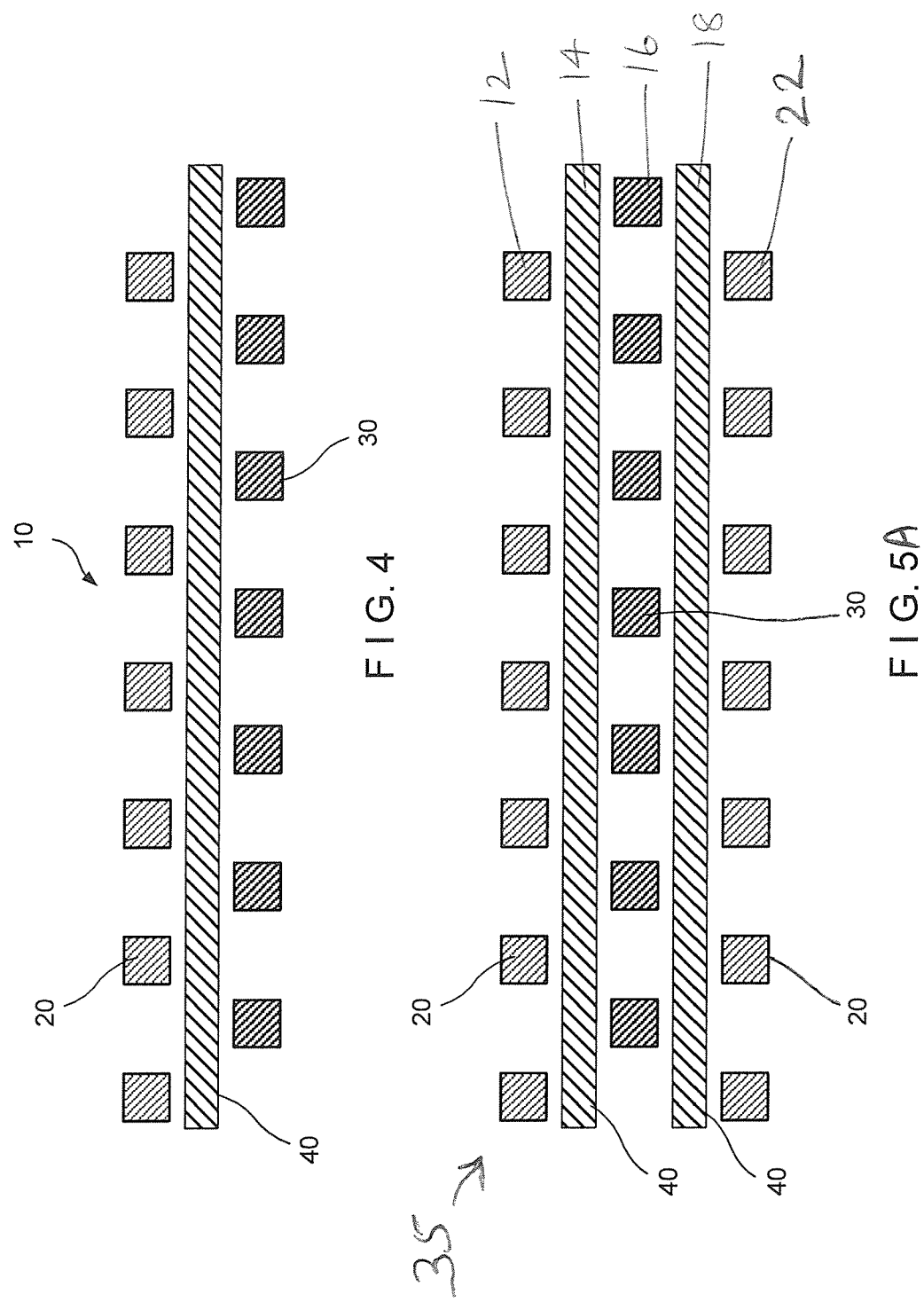

ULTRA-RESILIENT PAD

CROSS-REFERENCE TO RELATED APPLICATION

This application is a continuation-in-part of U.S. application Ser. No. 12/345,215 filed Dec. 29, 2008, which claims priority of U.S. Provisional Patent Application Ser. No. 61/017,447 filed Dec. 28, 2007, the entire disclosures of which are incorporated herein by reference.

FIELD OF THE INVENTION

The present invention relates to an ultra-compressible/resilient structure with excellent compressibility and resiliency for various uses such as, for example, athletic shoes, regular shoes, boots, floor carpets, carpet pads, sports floors etc. The structure itself can be the final product or the structure can be a component of another structure. Uses envisioned include, but are not limited to: automobile parts and other composites; flooring; subfloors especially in gymnasiums or other sports arenas; press pads; ballistic cloth such as body armor or hurricane window protection; sporting equipment padding such as baseball catcher chest protectors; knee/elbow pads for runners, racers, skaters, volleyball players; cricket shin/knee pads; football hip pads; wall padding in stadiums, gymnasiums, arenas; shoe inserts (orthotics); heels/soles for athletic shoes e.g. running shoes; cushioning layer for bedding, vehicle seats, pillows; and other industrial uses where through thickness compressibility and resiliency is required.

BACKGROUND OF THE INVENTION

While composites are usually a fiber reinforced resin matrix that is rigid and incompressible in all dimensions, certain uses such as for automobile bumpers require some flexibility and shock absorbing capability, plus the ability to return to the original shape once an impact force is removed. Similarly, pads used in athletic shoes, floor carpets, carpet pads, gym floors etc. require the structures to have a high degree of both compressibility and resiliency so they can spring back to their original shape and size upon removal of an applied load.

In soles/heels for sports shoes, which are usually solid viscoelastomeric materials, some attempts to improve "cushioning" have been to mold in for example "air channels or pockets." However, the rigidity of the molded material is such that cushioning effects are limited. In related art, U.S. Pat. No. 3,553,857 to Pettit describes a sole unit of elastomeric soling material other than thermoplastic rubber and carrying a dried film of a solvent-based polyurethane or polychloroprene adhesive superimposed on a halogenated surface of the sole unit.

U.S. Pat. No. 3,733,721 to Clemens describes a resilient pad, for example, foamed elastomeric material with the pad being generally contoured for mounting on the bottom of an article of footwear, such as a shoe, or the like. The pad is provided with pressure sensitive adhesive on the upper side so that it can be adhered to the bottom of an article of footwear to provide a cushion, while the pad can readily be removed from the articles of footwear when desired.

U.S. Pat. No. 4,608,768 to Cavanagh describes an athletic shoe having a shock-absorbing running sole which has at least one intermediate support extending at least approximately in parallel with a major plane of the running sole. The intermediate openwork support is disposed in a softly elastic midsole provided between an insole and a running sole.

U.S. Pat. No. 5,480,646 to Vu relates to a pad for applying medicaments, such as an insole worn in footwear, lined with a mixture of cinnamon, aloe wood and anise star powders having a pervious surface for contacting the skin and exposing the skin to emanations from the powders. The pad has a plurality of chambers which contain portions of the powder and maintain the even distribution of the powder as a lining in the pad. See also patents discussed in the background of the '646 patent.

These structures, however, lack the required through thickness compression and spring back property. Incorporating "elastic" (in the thickness or radial direction) media into soles has affected to some degree the resiliency or spring back of the soles once a normal load is removed. But again, using these media, the compressibility and spring back is limited to some portion of the media thickness at most.

Therefore, it would be an advancement in the state of the "pad-making" art to provide a pad that provides excellent elastic behavior under load with high through thickness recovery.

SUMMARY OF THE INVENTION

The present invention is a 'shock-absorbing pad' that utilizes a unique structure which provides extremely elastic behavior under load with high through thickness recovery. The instant structure utilizes a hollow elastic media in any direction, which allows the entire structure to 'collapse' into itself, based primarily upon the elasticity of this media and the structure to conform under pressure, thus allowing this unique behavior.

One embodiment of the invention is an ultra-resilient pad for use in a sports shoe, running shoes, regular shoes, boots etc. The structure may be a woven or nonwoven fabric including functional yarns in a longitudinal or shute direction, layered both over as well as under the hollow elastic media layered in a cross-direction or warp direction. The hollow elastic media used in the cross-direction may be polyurethane, rubber or Lycra® or Estane® or any deformable material that has excellent elasticity, as in compressibility and resiliency, as well as strength to allow the structure to compress and rebound, or 'spring back.' The entire structure can be 'bound' together utilizing a "binder pick," or a yarn that is woven into the structure in order to bind the structure together to allow further processing of the said structure. Although binder picks are referred to herein, the binder yarns may be in a cross-direction instead, or in both longitudinal and cross-directions. Other means such as adhesives, welding technology or laser bonding can also be utilized for this bonding function.

The invention according to one embodiment is an ultra-resilient 'carpet pad' for use in floor carpets, sports floor, floor coverings etc. The structure may be a woven or nonwoven fabric including functional yarns in a longitudinal or shute direction, layered both over as well as under the hollow elastic media layered in a cross or warp direction. The hollow elastic media used in the warp direction may be polyurethane, rubber or Lycra® or Estane® or any deformable material that has sufficient elasticity as well as strength to allow the structure to compress and rebound, or 'spring back.' The entire structure can be 'bound' together utilizing a "binder pick," or a yarn that is woven into the structure in order to bind the structure together to allow further processing of the said structure. Again, although binder picks are referred to herein, the binder yarns may be in a cross-direction instead, or in both longitudinal and cross-directions. Other means such as adhesives, welding technology or laser bonding can also be utilized for this function.

An object of the invention is to provide a structure that has improved recovery characteristics over memory foams, gels, spring systems, etc.

Another object of the invention is to form a smooth and uniform surface over the pad in order to improve support for the shoe and the foot.

Yet another object of the invention is to form a 'planar,' crossless structure with improved support of the carpet/sport floor/floor material.

Yet another object of the invention is to provide excellent retention of the recovery/dampening characteristics by utilizing the hollow elastic material's 'full' recovery within the structure, as opposed to straight compression of materials. This is achieved due to the structure providing support between the sections of the hollow elastic material, which avoids 'overstressing' the material, keeping it 'alive' and resulting in a longer useful lifetime.

Yet another object of the invention is to provide excellent resistance to moisture damage or problems due to water holding in certain applications due to the self-cleaning effect due to compression and subsequent recovery.

Yet another object of the invention is to provide an excellent compression recovery versus weight ratio, allowing significant dampening capability with light weight on structures.

Yet another object of the invention is to provide excellent 'breathability' of the shock absorbing structure, allowing perspiration and other moisture to evaporate and/or be removed during the compression phase.

Accordingly, disclosed is a compressible resilient pad, wherein the pad includes a structure comprising: a plurality of parallel cross-direction or warp yarns and a plurality of parallel longitudinal or shute yarns, wherein either or both of shute yarns or warp yarns are comprised of a hollow elastic (in the thickness or radial direction and in the length or axial direction) material members with excellent compressibility and resiliency. The structure comprises a first layer of the parallel yarns running in either the warp or the shute direction, a second layer of the parallel yarns on one side of the first layer, the second layer's yarns running in the warp or shute direction different from that of the first layer and comprising the hollow elastic members and a third layer of the parallel yarns on the opposite of the second layer as the first layer and running in the same direction as those of the first layer. The parallel yarns of the third layer are aligned such that they nest between the spaces created between the parallel yarns of the first layer. In other words, this design can be classified as "crossless" in that the yarns or members in the warp and shute or shute direction do not interweave with each other, but are stacked orthogonal to each other and lie in separate planes. The structure can further comprise a binder yarn system. Binder yarns may be in the warp or shute direction or in both warp and shute directions. In the pad the number of yarns in the third layer can be less than the number of yarns in the first layer. The yarns of the second layer can be orthogonal to those of the first and third layers. The second layer can be at an angle of less than 90 degrees of the first and third layer, such as at an angle of 45 degrees.

The pad's structure can comprise a fourth layer of parallel members in the same direction as the second layer, the yarns comprising the hollow elastic members, and a fifth layer of parallel yarns in the same direction as the first layer, wherein the yarns of the fifth layer are aligned in the same vertical plane in a through thickness direction as that of the first layer.

In yet another embodiment, disclosed is a compressible resilient pad, wherein the pad includes a structure comprising: a plurality of warp yarns, a plurality shute yarns, wherein any number of the shute yarns and warp yarns are interwoven to form a woven structure; and wherein any number of the yarns are comprised of an axially and radially elastic hollow material members. The pad can further comprise a binder yarn system. In one embodiment, the pad can be woven in a 2-8-shed pattern.

It will be noted that in each of the embodiments described herein, the hollow elastic members can be incorporated into any or both of the warp and shute directions to give the desired qualities of compressibility and resilience. Also, any number of layers can include any number of hollow elastic members, provided at least one layer of the final structure entirely consists of the hollow elastic members. The hollow elastic members can have any form as appropriate for the application and can be, for example, single monofilament, plied monofilament or multifilament, wrapped member of different materials, multicomponent member, knitted member, twisted member, or braided. The hollow elastic members can be partially composed of an elastic material, such as a multicomponent member where one component is the elastic material, or the hollow elastic member can be wholly comprised of the elastic material. The hollow elastic member may have a circular or non-circular cross sectional shape. The non-circular cross sectional shapes may include, but are not limited to, square, rectangular, triangular, elliptical, trapezoidal, polygonal, and lobate shapes. The hollow elastic member can have one or more holes running along its length or axial direction, and the holes themselves can have a circular or non-circular cross sectional shape including square, rectangular, triangular, elliptical, trapezoidal, polygonal, and lobate shapes, and can be of any suitable size. Examples of good elastic materials include, but are not limited to, polymers such as polyurethane, rubber or that sold under trademarks Lycra® by Invista or Estane® by Lubrizol.

In the disclosure and the embodiments therein, the pad's structure can comprise a laminated structure. The laminated structure can include two independently woven fabric layers with the hollow elastic member layer there between. The laminated structure can also include a binder yarn system weaving between the layers of the laminate.

In the disclosure and the embodiments therein, the pad can also include a structure where the binder yarn system and the hollow elastic members are in the same direction. The direction of the hollow elastic members and the binder yarns can be the warp or shute direction. Such a structure can include a layer of hollow elastic members that are inside a double layer construction. In the pad the structure can include the hollow elastic members composed of a coarser (larger) warp, and the binder yarns composed of a warp smaller than that of the hollow elastic members.

In the disclosure and the embodiments herein, in the pad, the structure can be either a final product or the structure can be a component of another structure. The pad can be included in or can be a product selected from the group of products including: footwear; shoes; athletic shoes; boots; flooring; carpets; carpet pads; sports floors; automobile parts; composites; subfloors; gymnasium subfloors; sports arena subfloors; press pads; ballistic cloth; body armor; hurricane window protection; padding; sporting equipment padding; baseball catcher chest protectors; knee/elbow pads;

hip pads; wall padding; shoe inserts and orthotics; heels/soles for athletic shoes; a cushioning layer for bedding, and vehicle seats. The structure can also include a material that allows a surface to be exchangeable; the material can be a hooked loop yarn.

For example, an automobile bumper with the inventive structure as a layer, the structure layer free of resin in its interior to allow movement as desired, is an improvement over that currently used. The present invention can also be used as shoe inserts or orthotic inserts, which are usually molded solid resin. Incorporation of a layer of the ultra-resilient pad according to the present invention improves the cushioning effect thereof. Incorporation of the ultra-resilient pad according to the present invention as a layer in a cast structure, free of "resin" to allow movement, substantially improves the cushioning effect of running/athletic shoes.

In the disclosure and the embodiments herein, the layers of the structure can comprise a plurality of adjoining layers comprising the hollow elastic material.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein together with the description serve to explain the principles of the invention. In the drawings:

FIG. 4 shows the formation of a structure, according to one embodiment of the invention;

FIGS. 5A-B are a side view and a profile view of a further embodiment of the inventive pad, respectively;

DETAILED DESCRIPTION OF THE INVENTION

The invention, according to one embodiment, is a 'shock-absorbing' pad that utilizes a unique structure which provides extremely elastic behavior under a normal pressure load with high caliper recovery. This ultra-resilient structure with excellent compressibility and resiliency can be used in various applications such as, for example, athletic shoes, regular shoes, boots, floor carpets, carpet pads, sports floors etc. The structure itself can be the final product or the structure can be a component of another structure. Uses envisioned include, but are not limited to: automobile parts and other composites; flooring; subfloors especially in gymnasiums or other sports arenas; press pads; ballistic cloth such as body armor or hurricane window protection; sporting equipment padding such as baseball catcher chest protectors; knee/elbow pads for runners, racers, skaters, volleyball players; cricket shin/knee pads; football hip pads; wall padding in stadiums, gymnasiums, arenas; shoe inserts (orthotics); heels/soles for athletic shoes e.g. running shoes; cushioning layer for bedding, vehicle seats, pillows; and other industrial uses where through thickness compressibility and resiliency is required.

This structure utilizes a hollow elastic member in one direction of a woven or non-woven structure or fabric, which allows the entire structure to 'collapse' into itself, based upon the elasticity of this member and the base fabric structure to conform under pressure, and then recover to substantially the same original form and thickness, thus allowing a unique behavior.

Figure 14:
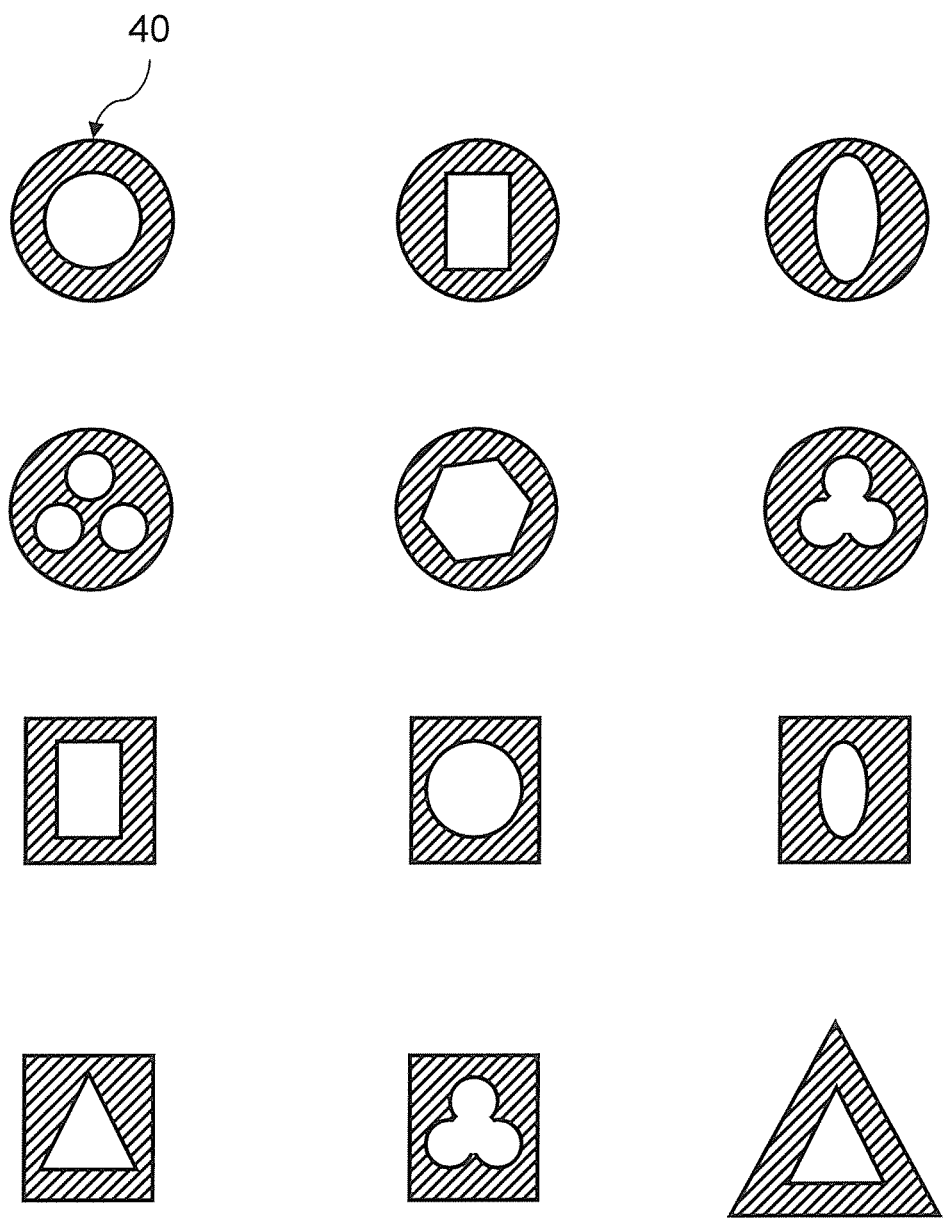
FIG. 14 shows different cross sections of the hollow elastic member of the present invention.

The hollow elastic member is defined as elastic in its thickness or radial direction and length or axial direction and is required for all the embodiments discussed herein. The hollow elastic member can have any form as appropriate for the application and can be, for example, single monofilament, plied monofilament or multifilament, wrapped member of different materials, multicomponent member, knitted member, twisted member, or braided. The hollow elastic members can be partially composed of an elastic material, such as a multicomponent member where one component is the elastic material, or the hollow elastic member can be wholly comprised of the elastic material. The hollow elastic member may have a circular or non-circular cross sectional shape. The non-circular cross sectional shapes may include, but are not limited to, square, rectangular, triangular, elliptical, trapezoidal, polygonal, and lobate shapes. The hollow elastic member can have one or more holes running along its length or axial direction, and the holes themselves can have a circular or non-circular cross sectional shape including square, rectangular, triangular, elliptical, trapezoidal, polygonal, and lobate shapes, and can be of any suitable size. Some non-limiting examples of cross-sectional shapes for the hollow elastic member are illustrated in FIG. 14. It should be noted that the hollow elastic member of the present invention weighs less and compresses more (in a thickness direction) than an elastic member of the same outer diameter but without any hole(s) running along its length or axial direction Examples of few good elastic materials include, but are not limited to, polymers such as polyurethane, rubber, or that sold under trademarks Lycra® by Lubrizol.

Figure 1:
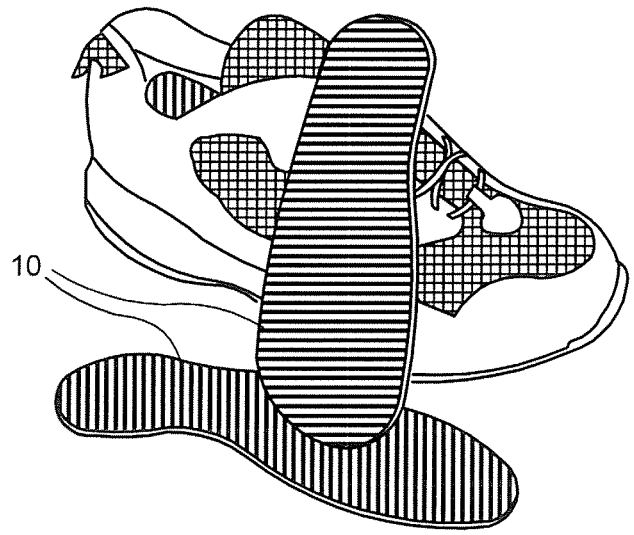
FIG. 1 shows an ultra-resilient shoe pad, according to one embodiment of the invention.
Figure 2:
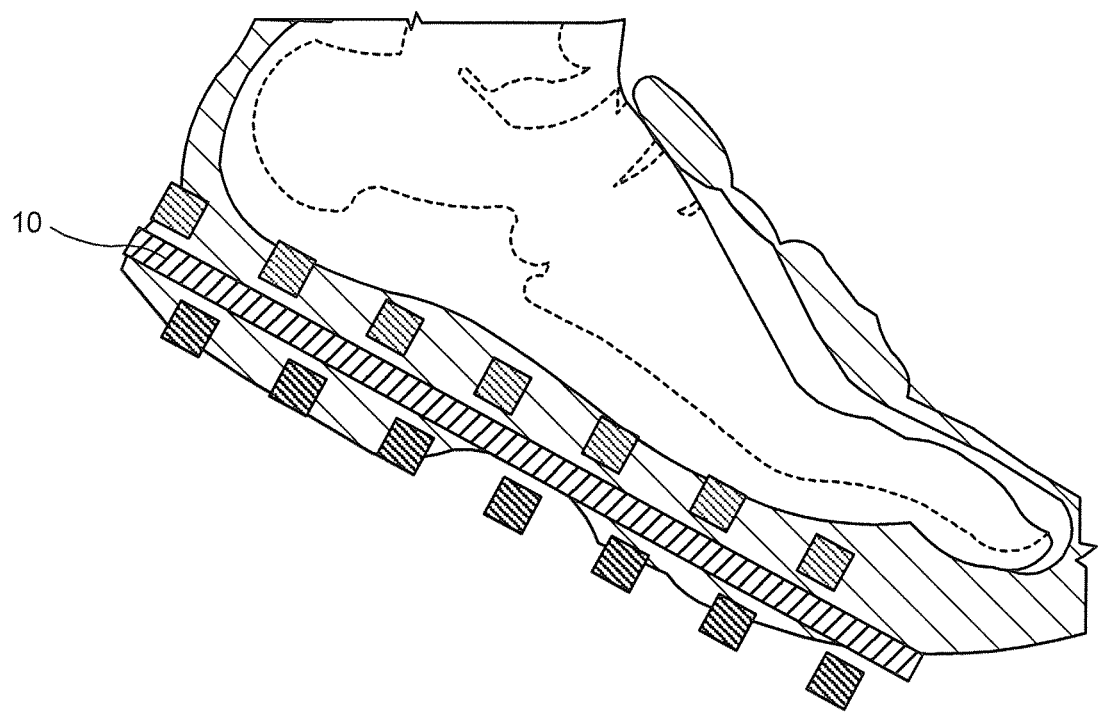
FIG. 2 shows installation of the ultra-resilient shoe pad within a shoe, according to one embodiment of the invention.
Figure 3:
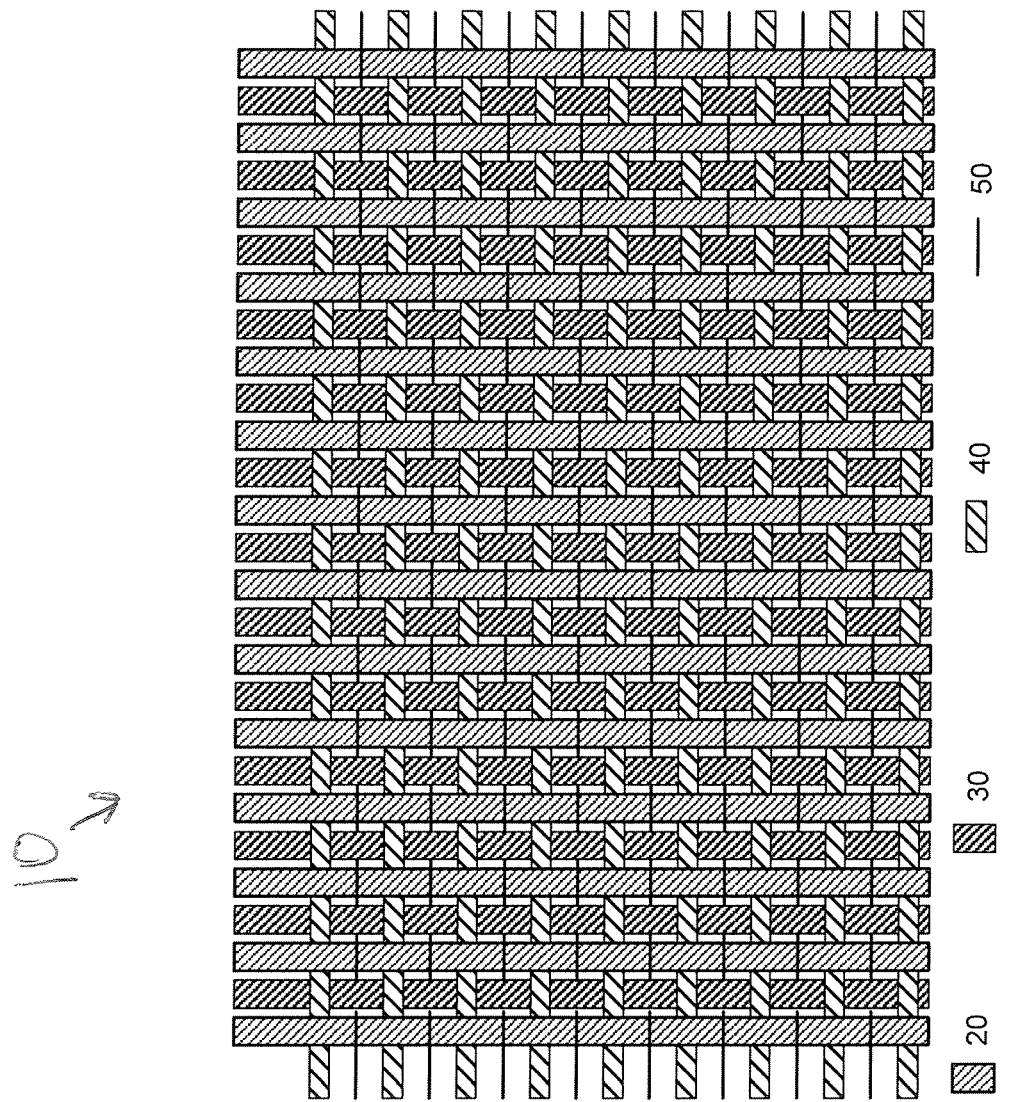
FIG. 3 shows a woven structure, according to one embodiment of the invention.

One embodiment of the invention is shown in FIG. 1, which is a shoe pad 10 for use in shoes such as sports shoes, running shoes, regular shoes, boots etc. FIG. 2 illustrates an example of the installation of the shoe pad 10 into foot wear, for example, a shoe. FIG. 3 is a 'top view' of the structure according to one example of the invention, also referred to as the base fabric, looking from above the fabric. FIG. 3 illustrates the use of functional yarns 20, 30 in one direction, for example a longitudinal or shute direction of the fabric, layered both over as well as under the layer of hollow elastic members 40 in the cross-direction or warp direction. At this point, hollow elastic member 40 conforms to the nesting of functional yarns 20, 30, and bends and flattens/stretches around functional yarns 20, 30. Functional yarns can include any type of yarns (as in single monofilaments, multifilaments, texturized multifilaments, etc.) or combined structures (twisted, plied, knitted, braided of any number of materials, etc.), as known by ordinarily skilled artisans.

The hollow elastic member 40 may be a polymer such as polyurethane, rubber, or that sold under trademarks Lycra® by Invista or Estane® by Lubrizol, or any deformable material that has sufficient elasticity as well as strength to allow the structure to rebound, or 'spring back.' The structure 10 may be made in a 90 degree fashion, switching the longitudinal and cross-direction yarns. It is to be noted that yarns/material/bands/cords/media 20, 30 are offset in the total structure 10 in order to allow the longitudinal sections to compress almost completely without interfering with one another in order to form a planar structure still with open area, so as to allow permeability. The entire structure 10 can be 'bound' together utilizing "binder picks" 50 as shown in FIG. 3, or another yarn that is woven into the structure in order to bind it together in order to allow further processing of the 'base fabric.' Although binder picks are referred to herein, the binder yarns may be in the warp direction instead, or in both warp and shute directions. Other means, such as for example, adhesives, welding technology or laser bonding can also be utilized for this function of holding the structural yarns together.

Figure 6:
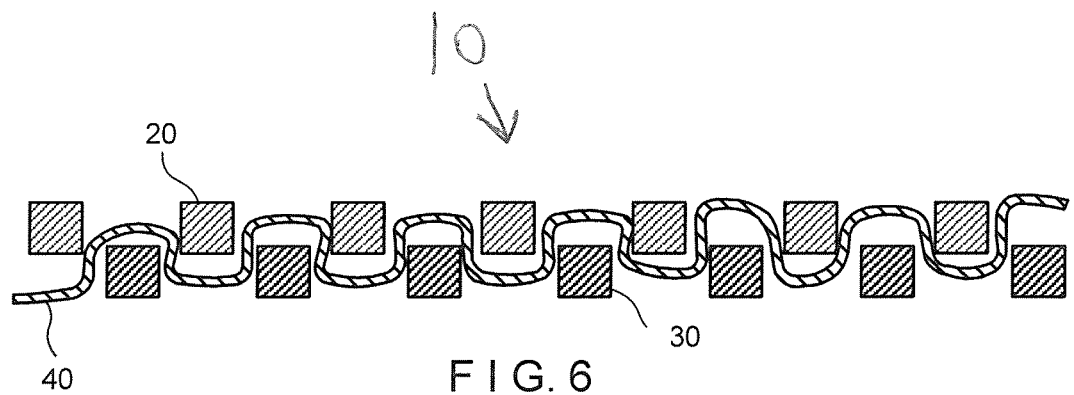
FIG. 6 shows yet another step in the formation of a structure, according to one embodiment of the invention.

Upon application of a compressive load the hollow elastic members 40 will stretch allowing the yarns 20 and 30 to move towards each other and to "nest" between each other, virtually almost in the same plane, as shown in FIG. 6. At this point, hollow elastic members 40 conform to this nesting, and bend and flatten/stretch around yarns 20, 30 in the top layer and bottom layer. Upon release of the load, due to the elastic behavior of the member 40, they will cause the yarn layers 20 and 30 to move apart from each other or "spring back", returning the fabric to its desired thickness and openness as shown in FIG. 4. Therefore, a pad having a total thickness of the thickness of yarns 20 plus the thickness of yarns 30 plus the thickness of hollow elastic member 40 under normal uncompressed state is compressible and resilient to almost an entire yarn thickness, i.e. the thickness lost is some portion of the hollow elastic member 18, and the fabric can be almost as thin as the thicker diameter of yarn 20 or 30, in a compressed state. It is important to note that although functional yarns 20, 30 are illustrated as having a square cross-section in some figures, they can be of any size, shape, material or form suitable for the purpose.

In another embodiment similar to that of the above, layers of yarns 20 and 30 have the same position and relative orientation/spacing as above, but the layer of hollow elastic member 40 is oriented at less than 90 degree angle to the top and/or bottom layers, preferably at a 45 degree angle.

Furthermore, there can be more than two layers of functional yarns and more than one layer of the hollow elastic member as shown in FIG. 5A. With three layers of functional yarns, for example, two of the three yarn layers must be spaced apart relative to each other to allow nesting. For example, top and middle layers can be oriented such that yarns in the middle layer fit in the space between two adjacent yarns of the top and yarns in the bottom layer are stacked in vertical orientation with either the top or middle layers. Furthermore, both layers in cross-direction can include the hollow elastic members, or only one layer can include the hollow elastic members and the other layer can be a functional yarn layer. Again yarns in the top, middle and bottom layers can be the same or different from each other in form, material, shape, etc.

Figure 5B:
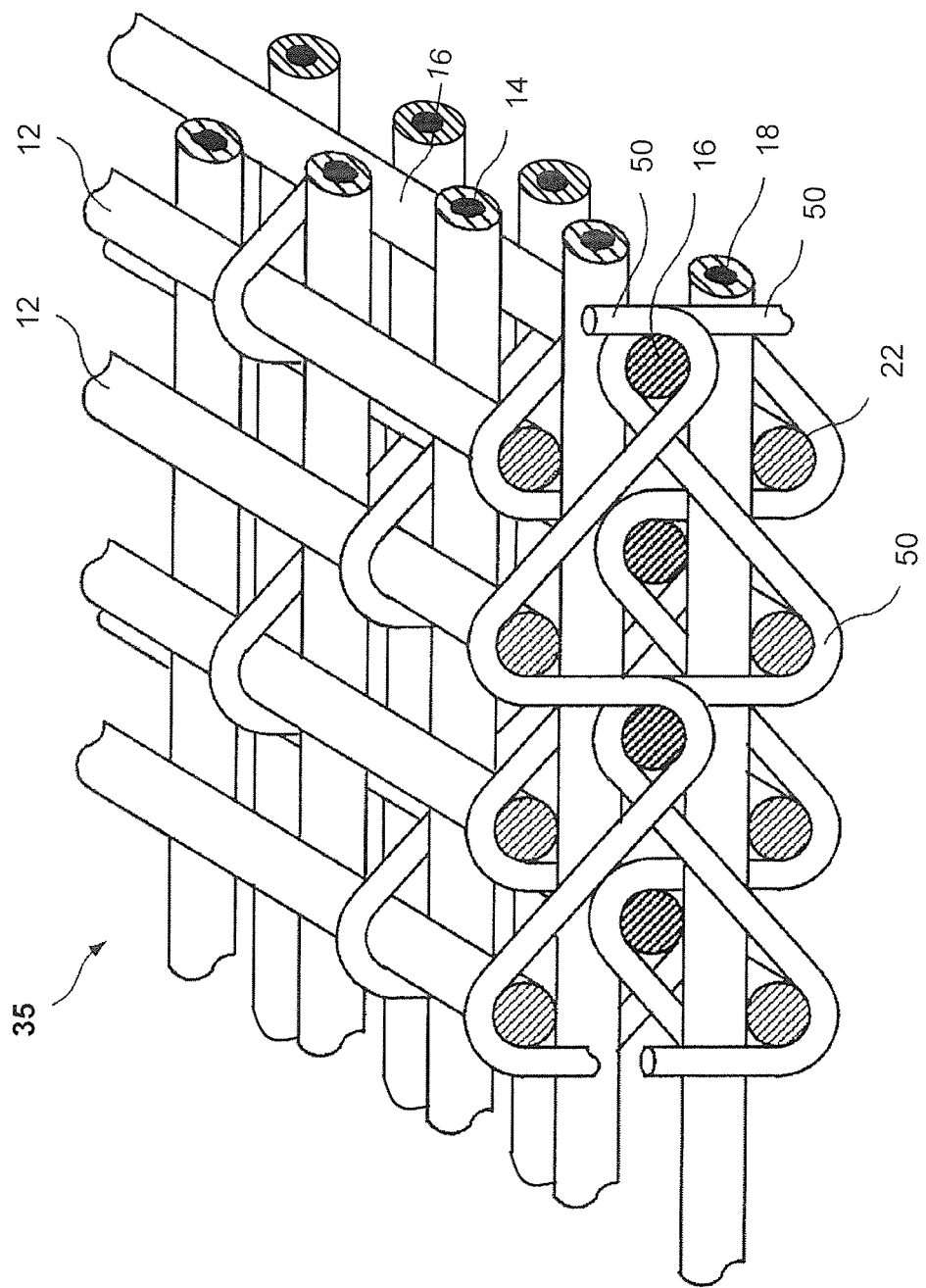

A profile view of structure 35 is shown in FIG. 5B, which comprises five layers in generally parallel planes with each layer comprising a plurality of parallel yarns/members. The yarns of the first, third and fifth layer (i.e. layers 12, 16 and 22) are oriented in a longitudinal direction, for example, while the hollow elastic members of the second and fourth layers (i.e. layers 14 and 18) are oriented in the cross-direction, for example. As shown therein, functional yarns 30 in the third layer 16 are spaced apart in the manner described above such they fall between the yarns 20 of the first layer 12 and the fifth layer 22, thereby causing the "nesting" described above. The second layer 14 and the fourth layer 18 include the hollow elastic members 40. The binder yarns 50 (not shown) are disposed in the cross-direction, for example, though they can be disposed in the longitudinal direction too. Though some embodiments described herein have the first, third and fifth layer oriented in the longitudinal direction, and the hollow elastic members of the second and fourth layers oriented in the cross-direction, the layers can be interchangeably used, so long as there is at least one layer of the hollow elastic members. For example, the first and fifth layers can be oriented in the cross-direction, and the hollow elastic members of the second and fourth layers in combination with the functional yarns of the third layer can be oriented in the longitudinal direction. Similarly, the binder yarns 50 can be disposed in either or both directions, as required.

Layers 12, 14, 16, 18 and 22 are not interwoven, as illustrated in FIG. 5. Instead one or more relatively thin threads or binder yarns 50 are used to bind the layers vertically together. This type of construction insures that the individual yarns of the layers do not shift laterally. Binder yarns can alternate from one row to another, each row extending in a cross-direction, for example.

Also the degree of compression/resiliency is controlled by the elasticity of the required elastic members, number of layers of the elastic members, size, shape and number of elastic members in each layer of the elastic members, and of course the totality of the structure itself. The inventive structure can also be part of a laminate with other yarn arrays or base fabrics attached thereto. The structure can have a layer of coating on either or both surfaces and the coating can also partially or fully encapsulate or impregnate the entire structure. The coating/impregnant may also be a reticulated or nonreticulated foam.

Any of the longitudinal yarns can be single in nature (as in single monofilaments, multifilaments, texturized multifilaments, etc.) or combined structures (twisted, plied, knitted, braided of any number of materials, etc.), as known by ordinarily skilled artisans. They can be permeable or impermeable to fluids. They can be made of polymers such as polyesters, polyurethanes, polyamides, polyolefins, or metals, rubber, etc. or combinations thereof.

The fabric can be needled, if necessary, with fibers to produce a smooth surface, and can be coated with foams, coatings, or particulates. Other forms include a membrane, a yarn array, or another yarn fabric can be laminated to the fabric. The structure which includes these hollow elastic members must be constructed to have sufficient degree of compressibility as well as have sufficient elasticity as well as strength to allow the structure to rebound, or 'spring back.' The compression and rebounding of the structure has the following benefits:

1.) Improved recovery characteristics over memory foams, gels, spring systems, etc,
2.) Smooth and uniform surface characteristics in, for example, items having 'planar,' crossless structure of yarns. (e.g.: to allow for improved support of the shoe and the foot).
3.) Excellent retention of the recovery/dampening characteristics due to the hollow elastic material members' 'full' recovery within the structure (as opposed to straight compression of materials). This is due to the structure providing support between the sections of the hollow elastic material members; this avoids 'overstressing' the material member, keeping it 'alive' (e.g., for a longer useful lifetime).
4.) Excellent resistance to moisture damage or problems due to water holding due to self-cleaning effect of compression and recovery.
5.) Excellent compression recovery vs. weight ratio, allowing significant dampening capability with light weight.
6.) Excellent 'breatheability' of the shock absorbing structure, allowing perspiration and other moisture to evaporate and/or be removed at compression.

Structure 35 can be woven flat, endless, or compiled in another manner known to one of skill in the art. The indexing of the said longitudinal layers (or cross-direction layers if oriented in the other direction) can be critical, as the spacing of the structure must allow a uniform compression of the yarns in one layer into the yarns of another layer, thus allowing a uniform behavior over the entire length and width of the structure. It is to be noted that the structure can also be built without weaving, by subsequently laying said yarns/members perpendicular to one another as shown in FIGS. 4 and 5 and properly indexing in order to result in the finished structure. These yarns/members can be fixed in place via adhesives, welding techniques (laser and/or ultrasonic, for instance), or adhered with other welding and/or gluing techniques. Numerous layers can also be stacked in a perpendicular or angled fashion over each other to create a thicker, even more compressible structure.

The invention, according to one embodiment, is a 'carpet pad' that utilizes a unique structure 60 which provides extremely elastic behavior under load with high caliper recovery. This structure 60, for example shown in FIG. 7, utilizes a hollow elastic member 140 in one direction of a woven fabric which allows the entire structure to 'collapse' into itself, based primarily upon the elasticity of this hollow member 140 and the base fabric structure to conform under pressure, and rebound when the pressure is released, thus allowing this unique behavior.

Figure 7:
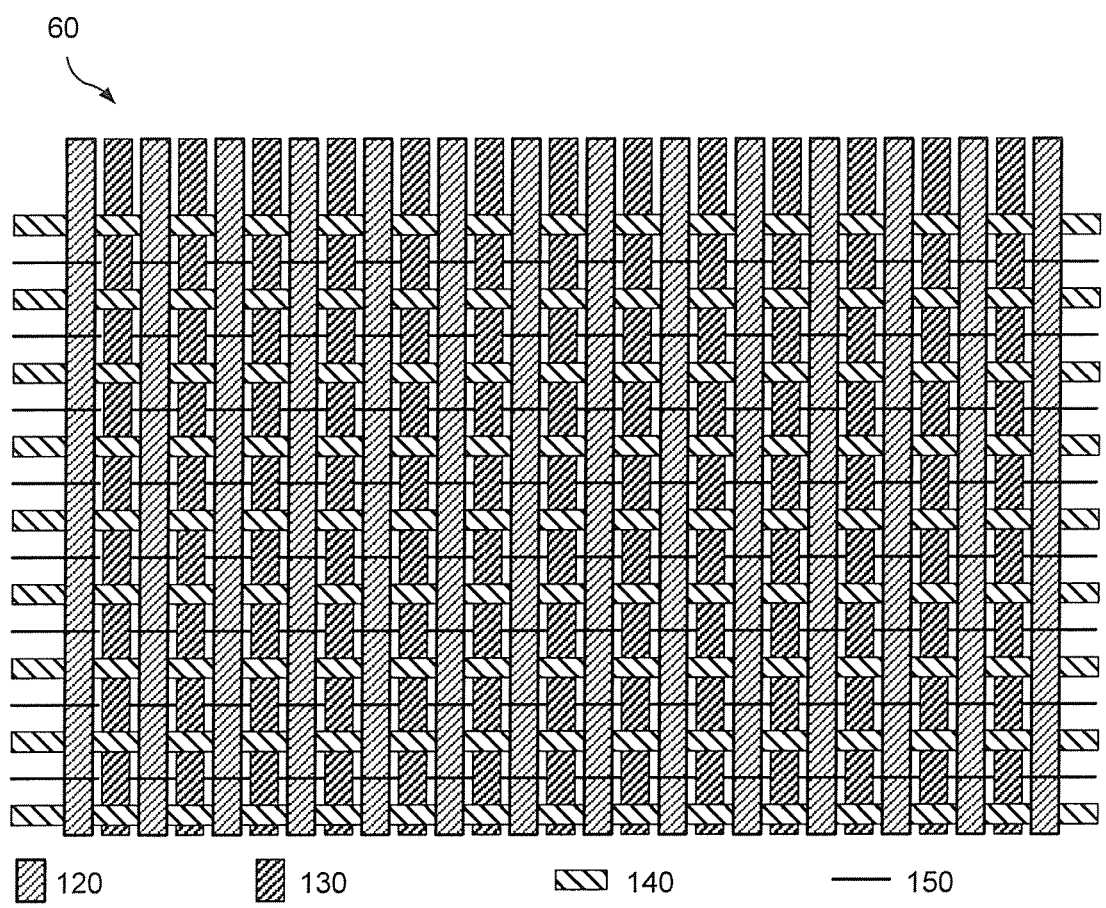
FIG. 7 shows a woven structure, according to one embodiment of the invention.

FIG. 7 is a 'top view' of the structure according to the invention, also referred to as the base fabric, looking from above the fabric. Yarns 120, 130 are used in one direction, for example a longitudinal direction of the fabric, layered both over as well as under the hollow elastic member 140 in the cross-direction. The hollow elastic member 140 may be polyurethane, rubber or Lycra® or Estane® or any deformable material that has sufficient elasticity as well as strength to allow the structure to rebound, or 'spring back.' The structure 60 may be made in a 90 degree fashion, switching the longitudinal and warp yarns. It is to be noted that yarns/bands/cords 120, 130 are offset in the total structure 60 in order to allow the longitudinal sections to compact totally without interfering with one another in order to form a planar structure still with open area, so as to allow permeability. The entire structure 60 can be 'bound' together utilizing "binder picks' 150 as shown in FIG. 7, or another yarn that is woven into the structure in order to bind it together in order to allow further processing of the said 'base fabric.' Although binder picks are referred to herein, the binder yarns may be in the warp direction instead, or in both warp and shute directions. Other means such as for example adhesives, welding technology or laser bonding can also be utilized for this function.

Any of the longitudinal yarns can be single in nature (as in monofilaments, multifilaments, texturized multifilaments, etc.) or combined structures (twisted, plied, knitted, etc.). They can be permeable or impermeable to fluid. They can be comprised of polyesters, polyurethanes, polyamides, polyolefins, metals, rubber, Lycra® or Estane® etc. or combinations thereof. The fabric can be needled, if necessary, with fibers to produce a smooth surface of the fabric, and/or can be coated with foams, resin or latex coatings, or particulates. The structure that contains the hollow elastic members must allow the structure to compress and rebound, or 'spring back.' The rebounding of the structure has the following benefits:

1.) Improved recovery characteristics over memory foams, gels, spring systems, etc.
2.) Smooth and uniform surface characteristics due to 'planar,' crossless structure of yarns (e.g., to provide improved support of the carpet/sport floor/floor material).
3.) Excellent retention of the recovery/dampening characteristics due to the hollow elastic material members' 'full' recovery within the structure (as opposed to straight compression of materials). This is due to the structure providing support between the sections of the hollow elastic material members; this avoids 'overstressing' the material member, keeping it 'alive.' This provides, inter alia, a longer useful lifetime.
4.) Excellent resistance to moisture damage or problems due to the water holding due self-cleaning effect of compression.

The structure 60 can be woven flat, endless, or compiled in another manner known to one of skill in the art. The indexing of the said longitudinal layers (or cross-direction layers if woven in the other direction) may be critical, as the spacing of the structure must allow a uniform compression of the yarns into one another, thus allowing a uniform behavior over the entire length and width of the structure. It is to be noted that the structure can also be built without weaving, by subsequently laying said yarns/members perpendicular or angled to one another and properly indexing in order to result in the finished structure. These yarns/members can be fixed in place via adhesives, welding techniques (laser and/or ultrasonic, for instance), or adhered with other welding and/or gluing techniques. Numerous layers can also be stacked in a perpendicular fashion or angled over each other to create a thicker, even more compressible structure.

In yet another embodiment, the layers of a fabric may each be formed by mixing different weave repeats or shed patterns. By way of background, in flat weaving, a warp yarn is threaded through a heddle, and the weave pattern is created by raising and lowering the heddle position for each yarn in the warp direction before the shute or pick is inserted into the shed created by raising or lowering the warp yarns. The number of yarns intersected before a weave pattern repeats is known as a shed. With this understanding, a plain weave utilizes, for example two sheds in a loom for changing the warp yarn positions, and can therefore be termed a two shed weave pattern. Accordingly a fabric can be comprised of a 2, 4, 6, 8 shed pattern and so on.

Figure 8:
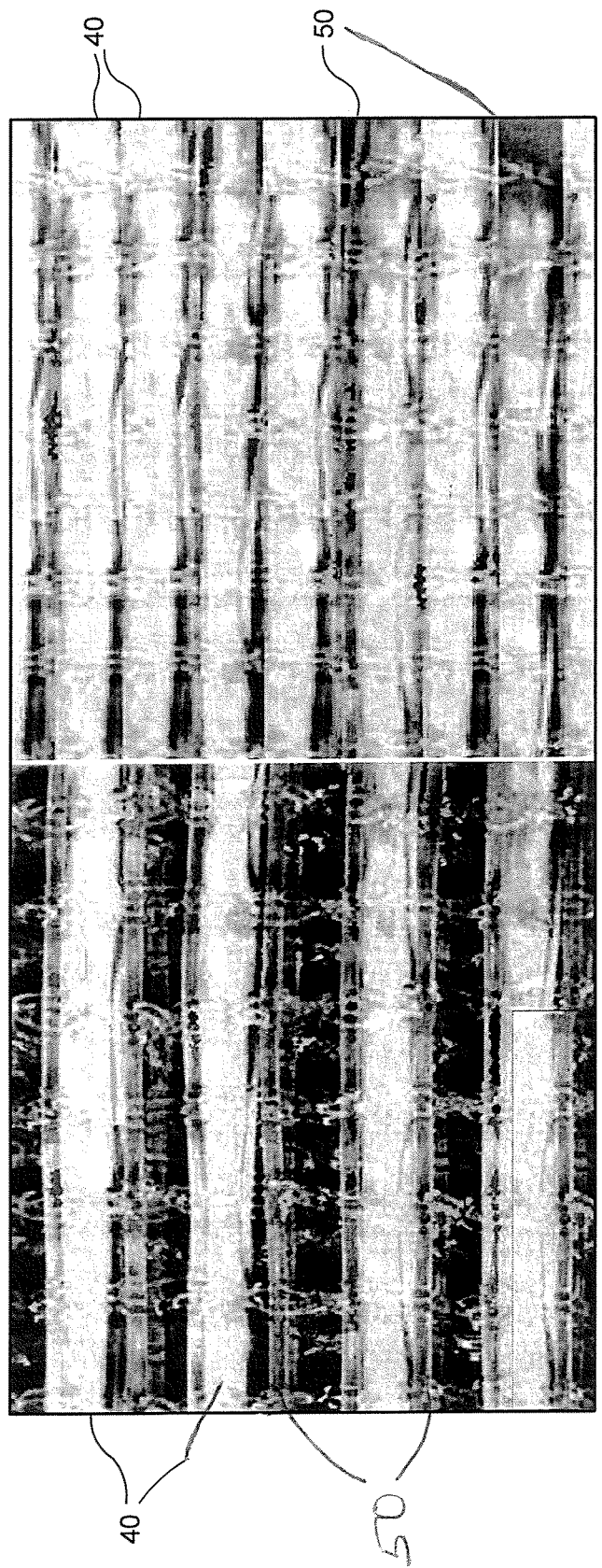
FIG. 8 shows another structure according to another embodiment of the invention.

FIG. 8 shows 2-shed pattern with a 0.35 mm shute yarn; the figure showing two differing densities for the hollow elastic member 40 and the binder yarn 50. For weaving a 2-shed surface for, for example, a 5-layer fabric with a hollow elastic member 18, a 16 harness (16/4=4, 4/2=2 shed) pattern can be used. In another example, a 2-layer 4/8-shed weave can have a 4 ply Lycra® or Estane® yarn as a shute.

Figure 9:
FIG. 9 shows an embodiment of the invention including a multi-component wound yarn comprising the hollow elastic member.
Figure 10A:
FIG. 10A shows an embodiment of a laminated structure.
Figure 10B:
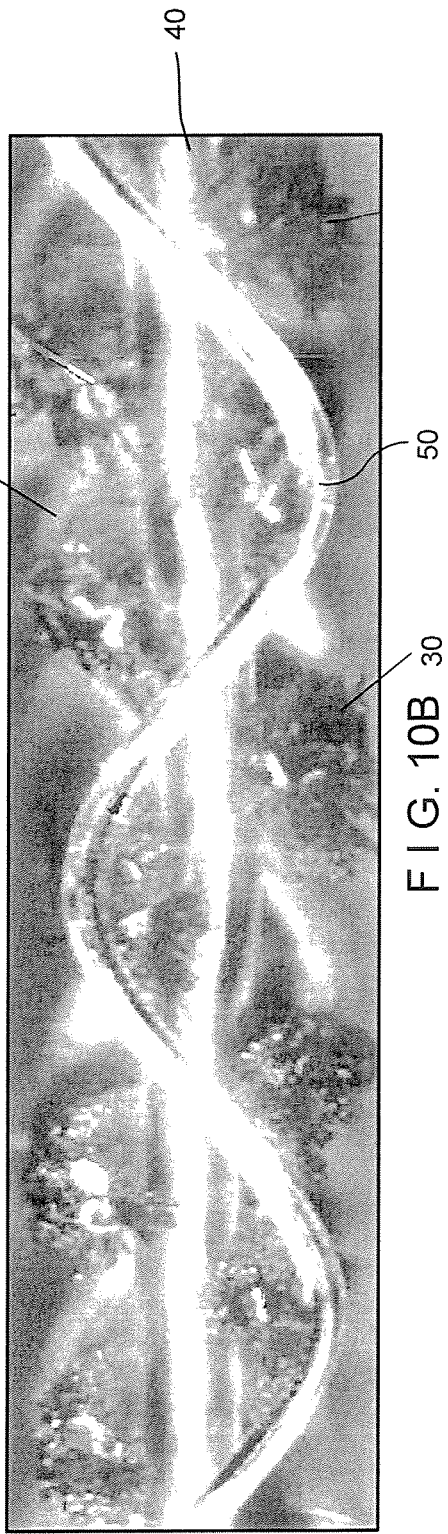
FIG. 10B shows a woven "crossless" structure.

Illustrating other embodiments of the structure, at FIG. 9 is shown the multi-component wound yarn comprising hollow elastic member 40 for a multi-layer fabric having a 2 layer construction. At FIGS. 10A and 10B are shown embodiments of laminated structures of the fabric. FIG. 10A shows a base structure with the hollow elastic member 40 and functional yarns 20, 30 laminated between two fabrics.

FIG. 10B shows a woven "crossless" base. The base shows the hollow elastic member 40 and the functional yarns 20 and 30 as well as a binder yarn 50. Also contemplated are other embodiments where the hollow elastic member can be a knitted, ply/twisted or a hooked loop yarn.

For the embodiment including a hooked loop yarn, a fabric can be adapted to, for example, readily attach and replace fabric surfaces that are worn due to the stresses pads and structures undergo. In another example, a fabric can have surfaces that are exchangeable, thus allowing the same fabric to be put to different uses, such as a sports floor where different surfaces are desired for different sports.

Figure 11:
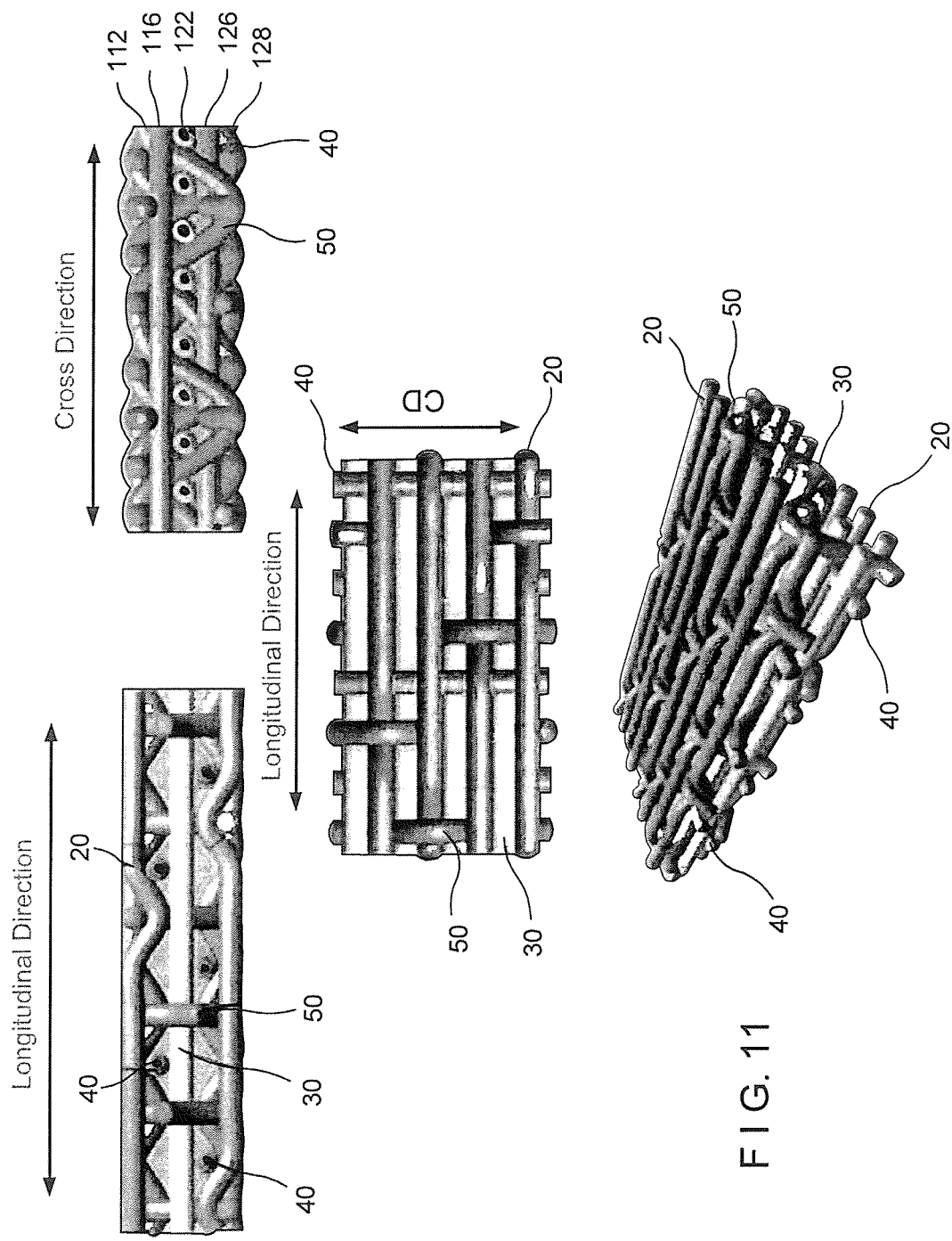
FIG. 11 shows an embodiment of the invention including a 5-layer compressible resilient fabric comprising a warp binder.

In another embodiment, FIG. 11 shows a 5-layer compressible resilient fabric comprising a warp binder 50. The array 116 including the hollow elastic member 40 running in the warp direction is positioned between the first array 112 and the third array 122. A fourth layer 126 including hollow elastic members 40 has the yarns positioned such that they are in alternating spaces in the vertical plane from the parallel hollow elastic members of the second layer 16. The yarns 20 of the fifth layer 128 are the same vertical plane the yarns 20 of the first layer 112. As shown in figures, each warp direction binder yarn 50 alternately weaves under and over three parallel yarns in the first and fifth layers, and is spaced in the shute direction such that long floats are created by each of the yarns 20 of the first layer 112 and the fifth layer 128. As shown, the hollow elastic members are inside a double layer weave construction, which can use a 16 harness as for endless weaving or an 8 harness weave for flat weaving. The fabric woven in accord with the embodiment can use the single monofilament warp yarns or 4 ply yarns or other yarn types. It is also possible to use two different warp yarns, a coarser (larger) warp including the hollow elastic member 40, and a smaller warp for the binder yarn 50. A fabric structure as shown in FIG. 11 can also be formed using two separate warp beams; for example, the coarser warp including the hollow elastic member 40 on one beam and the smaller warp including the binder yarn 50 on another beam. However, if two warp beams are not desired, the smaller binder yarns can be alternated with the hollow elastic warp members on the same beam. The weave, however, must be such that the hollow elastic members are allowed to stretch and compress, and the base compresses under a normal load then 'springs back' after removal of the load.

Figure 12:
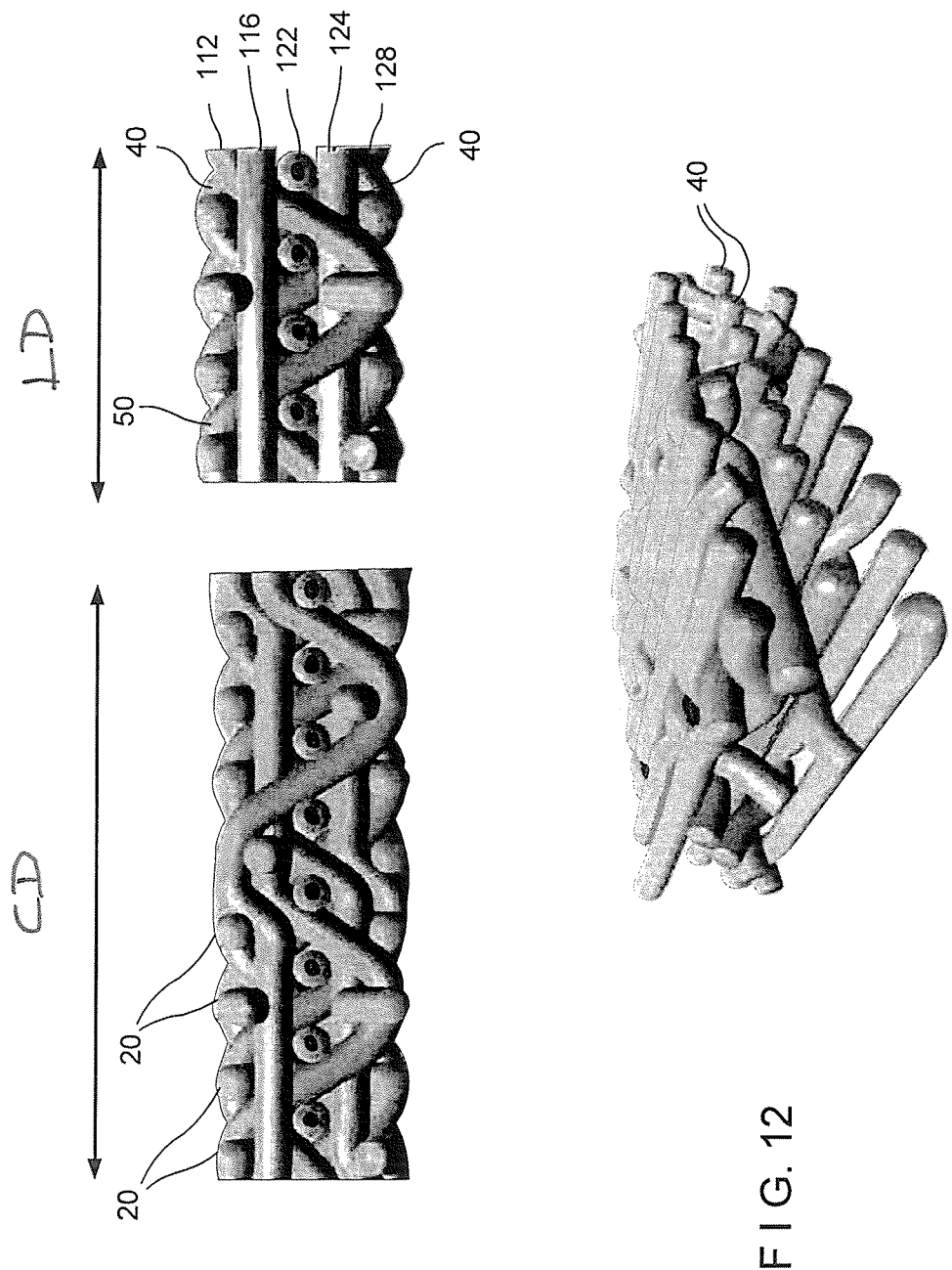
FIG. 12 illustrates another embodiment of the invention including a weaving in of the warp yarns.
Figure 13:
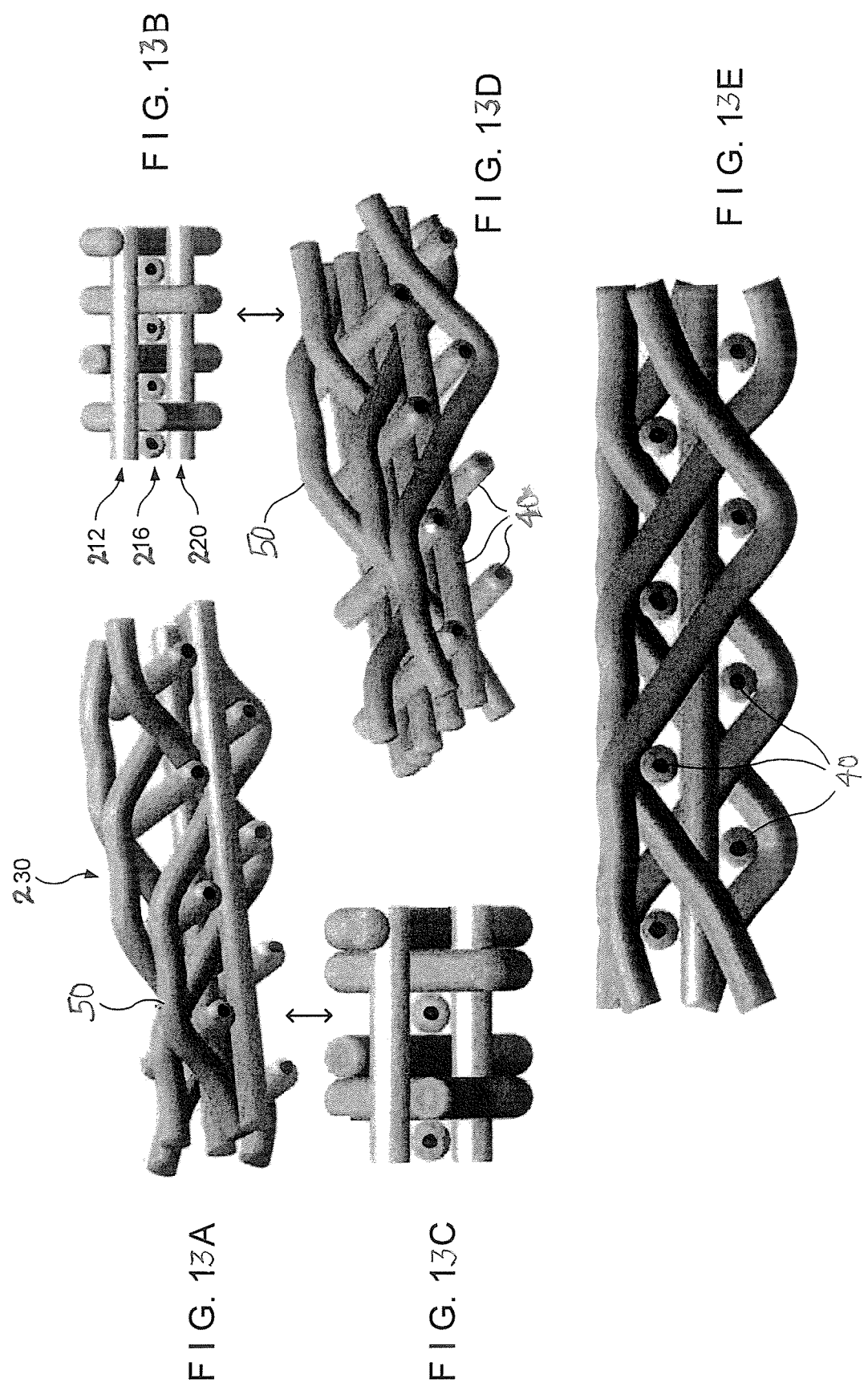
FIGS. 13A-13E show another interwoven variant of the embodied fabric.

FIG. 12 illustrates another embodiment. As shown therein four ends of yarns 20 the first layer 112 weave above the layers 116, 122, 126 of hollow elastic members 40, and changes over to a two-layer binder every second repeat, and four ends of yarns 20 weaving under the layers 116, 122, 126 and changes over to a two-layer binder every second repeat. Each layer need not be composed of hollow elastic members. However, the fabric structure should include at least one layer of hollow elastic members to exhibit the 'spring back' nature desired.

Another variant of the embodied fabric is shown in FIGS. 13A-13E, configuring the fabric with more or less longitudinal crimp weaves, and having the hollow elastic members in the interior layers. The Figures show three layers 212, 216, 220, of hollow elastic members 40; a top layer 212 and bottom layer 220 running in the cross-direction and a middle layer 216 arrayed lengthwise in the longitudinal direction. Binder yarns 50 run or weave through the structure as illustrated, where on the uppermost surface the yarns 50 extend over two of the top cross-direction layer 212 hollow elastic members 40 and weave downward to loop under a single cross-direction hollow elastic member 40 in the bottom layer 220 of the hollow elastic members, whereupon it weaves upward again. As shown, the binder yarns 50 are formed with a crimp 230, resulting in long floats on the top surface of the fabric and small knuckles on the bottom side of the fabric. However, the weave and placement of the hollow elastic members must be such that the hollow elastic members compress and stretch upon a normal load (pressure) being applied to the base fabric, and the base fabric 'springs back' upon removal of that load.

Modifications to the present invention would be obvious to those of ordinary skill in the art in view of this disclosure, but would not bring the invention so modified beyond the scope of the appended claims.

The invention claimed is:

1. A compressible resilient pad, wherein the pad includes a structure having an original thickness, the structure comprising:
    a plurality of parallel longitudinal yarns;
    a plurality of parallel cross-direction yarns;
    a plurality of parallel hollow elastic members;
    wherein the structure is a laminated structure of independent layers not interwoven comprising:
        a first layer of the parallel yarns running in either the longitudinal or the cross-direction;
        a second layer of the parallel hollow elastic members on one side of the first layer, the second layer's hollow elastic members running in the longitudinal or cross-direction different from that of the first layer; and
        a third layer of the parallel yarns on the opposite side of the second layer as the first layer and running in the same direction as those of the first layer,
    wherein the parallel yarns of the third layer are aligned such that the parallel yarns of the third layer nest between the parallel yarns of the first layer without interfering with one another to allow the structure to compact to form a planar structure in a through thickness direction when the pad is under a pressure load;
    wherein the hollow elastic members are elastic in their thickness or radial direction and length or axial direction such that under the pressure load the hollow elastic members stretch and compress to conform to the nesting and, the structure springs back to substantially the original thickness after removal of the pressure load.

2. The pad of claim 1 wherein the number of yarns in the third layer is less than the number of yarns in the first layer.

3. The pad of claim 1 wherein the hollow elastic members of the second layer are orthogonal to those of the first and third layers.

4. The pad of claim 1 wherein the structure comprises:
a fourth layer of parallel hollow elastic members in the same direction as the second layer; and
a fifth layer of parallel yarns in the same direction as the first layer, wherein the yarns of the fifth layer are aligned in the same vertical plane in a through thickness direction as that of the first layer.

5. The pad as claimed in claim 1, wherein the hollow elastic member is selected from the group consisting of: a monofilament, a multifilament, a plied monofilament or multifilament, a wrapped member of different materials, a knitted member, a twisted member, a multicomponent member, and a braided member.

6. The pad as claimed in claim 1, wherein the hollow elastic member is selected from the group consisting of: a polyurethane and rubber.

7. The pad as claimed in claim 1, wherein the hollow elastic member is selected from members having a cross-section of differing geometric configurations.

8. The pad as claimed in claim 7, wherein the hollow elastic member is selected from the group consisting of: circular, non-circular, square, rectangular, triangular, elliptical, polygonal, trapezoidal and lobate.

9. The pad of claim 1, wherein the hollow elastic member has one or more holes running along a length or axial direction thereof.

10. The pad as claimed in claim 9, wherein the one or more holes are selected from the group consisting of: circular, non-circular, square, rectangular, triangular, elliptical, trapezoidal, polygonal, and lobate.

11. The pad of claim 1 wherein the structure comprises: two woven layers with an elastic hollow member layer there between.

12. The pad of claim 1 wherein the structure comprises: a binder yarn system weaving between the layers.

13. The pad of claim 1 wherein the structure comprises:
four ends weaving above the layer of hollow elastic members and changes over to a two-layer binder; and
four ends weaving under the layer of hollow elastic members and goes over to a two-layer binder every second repeat.

14. The pad of claim 1 wherein structure is either a final product or the structure can be a component of another structure.

15. The pad of claim 1 wherein the pad is included in or is a product selected from the group of products including:
footwear; shoes; athletic shoes; boots; flooring; carpets; carpet pads; sports floors; automobile parts; composites; subfloors; gymnasium subfloors; sports arena subfloors; press pads; ballistic cloth; body armor; hurricane window protection; padding; sporting equipment padding; baseball catcher chest protectors; knee/elbow pads; hip pads; wall padding; shoe inserts and orthotics; heels/soles for athletic shoes; a cushioning layer for bedding, and vehicle seats.

16. The pad of claim 1 wherein the structure includes a material that allows a surface to be exchangeable.

17. The pad of claim 16 wherein the material is a hooked loop yarn.

18. The pad of claim 4 wherein the layers of the structure comprise:
a plurality of adjoining layers comprising the hollow elastic members.

* * * * *